United States Patent
Fujiwara (10) Patent No.: US 8,724,181 B2
(45) Date of Patent: May 13, 2014

(54) IMAGE READING APPARATUS AND IMAGE FORMING APPARATUS

(75) Inventor: Takashi Fujiwara, Aichi-ken (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 151 days.

(21) Appl. No.: 13/194,303

(22) Filed: Jul. 29, 2011

(65) Prior Publication Data
US 2012/0026558 A1  Feb. 2, 2012

(30) Foreign Application Priority Data

Jul. 29, 2010 (JP) ................................ 2010-170816

(51) Int. Cl.
H04N 1/04  (2006.01)

(52) U.S. Cl.
USPC ......................................................... 358/474

(58) Field of Classification Search
USPC ........... 358/470–498; 399/107–127, 361–381
See application file for complete search history.

(56) References Cited

U.S. PATENT DOCUMENTS

| | | | |
|---|---|---|---|
| 5,096,316 A | 3/1992 | Otsuka et al. | |
| 6,903,849 B2 | 6/2005 | Yokota | |
| 7,095,532 B2 | 8/2006 | Chang | |
| 7,969,621 B2 | 6/2011 | Shunji | |
| 2001/0040705 A1 | 11/2001 | Yokota | |
| 2006/0033775 A1 | 2/2006 | Tsai et al. | |
| 2006/0197801 A1 | 9/2006 | Hashii et al. | |
| 2008/0068679 A1* | 3/2008 | Murai | 358/497 |
| 2008/0081509 A1 | 4/2008 | Liu | |

FOREIGN PATENT DOCUMENTS

| | | |
|---|---|---|
| CN | 1318938 A | 10/2001 |
| CN | 101150644 A | 3/2008 |
| CN | 201491101 U | 5/2010 |
| JP | 02-101864 A | 4/1990 |
| JP | 02-137967 A | 5/1990 |
| JP | 07-321973 A | 12/1995 |
| JP | 09-109508 A | 4/1997 |
| JP | 2005-049612 A | 2/2005 |
| JP | 2005-070492 A | 3/2005 |
| JP | 2006-082381 A | 3/2006 |
| JP | 2006-096028 A | 4/2006 |
| JP | 2008-078851 A | 4/2008 |

OTHER PUBLICATIONS

CN Office Action mailed Aug. 20, 2013, CN Appln. 201110214131.6, English translation.

* cited by examiner

*Primary Examiner* — Vu B Hang
*Assistant Examiner* — Kevin Ky
(74) *Attorney, Agent, or Firm* — Banner & Witcoff, Ltd.

(57) ABSTRACT

An image forming apparatus is provided with a document receiving portion that receives a document, and an image reader that moves between a first end position of the document receiving portion and a second end position opposite to the first end position. The image reader reads the image of the document on the document receiving portion while moving in a predetermined direction. A cable is provided having an end connected to the image reader. A cable protrusion and a regulation protrusion are configured such that, along with movement of the image reader in the predetermined direction from the first position to the second position, the cable protrusion moves a predetermined distance in the predetermined direction and contacts the regulation protrusion, and the regulation protrusion regulates a further movement of the cable in the predetermined direction.

19 Claims, 8 Drawing Sheets

IMAGE READING APPARATUS AND IMAGE FORMING APPARATUS

CROSS REFERENCE TO RELATED APPLICATION

This application claims priority from Japanese Patent Application No. 2010-170816, filed on Jul. 29, 2010, the entire subject matter and contents of which is incorporated herein by reference.

TECHNICAL FIELD

Aspects of the invention relate to an image reading apparatus and an image forming apparatus, each including an image reader configured to read an image of a document on a document receiving portion while the image reader moves in a predetermined direction.

BACKGROUND

Some existing image reading apparatuses, so-called scanners, and image forming apparatuses having scanning capability may be configured to read an image of a document received on a document receiving portion by moving an image reader having an image sensor in a predetermined direction. In these apparatuses, the image reader is connected to a controller disposed under the image reader via a flexible flat cable (hereinafter referred to as a flat cable) to communicate with the controller about reading results of the image reader and to receive electricity from the controller.

The image reader may be configured to move reciprocally in a predetermined direction along an under surface of the document receiving portion (that is, an under surface of a contact glass constituting the document receiving portion) to read an image of a document received by the document receiving portion. The flat cable extends along a moving direction of the image reader, and is disposed horizontally relative to the contact glass. Thus, if there is not enough space under the contact glass because of the need to reduce the physical size and thickness of the apparatus, the flat cable may slide on the contact glass in accordance with movement of the image reader, and may thus buckle. Alternatively, in accordance with the movement of the image reader, the flat cable may wind around the image reader. If the flat cable buckles or winds around the image sensor, the flat cable may interfere with the movement of the image reader, so that the flat cable may be broken or a document reading error may occur.

To overcome the above problems, a known document reader includes a guiding device disposed on an under surface of the image reader and configured to urge the flat cable downward. When the image reader moves to read an image of a document, the guiding device slides on an upper surface of the flat cable while urging the flat cable downward. Thus, the chances of the flat cable moving upward to where the image reader and the contact glass are located, winding around the image reader, and contacting the contact glass can be reduced.

SUMMARY

As the above document reader is structured to dispose the guiding device on the under surface of the image reader, parts such as a compression spring constituting the guiding device and a part having a slide surface are required, thus resulting in increased number of parts and operations. In the document reader, the compression spring is required to have an adequate urging force, because it urges the cable downward. If the urging force of the compression spring is too small, the cable cannot be urged fully downward, and the cable may be raised upward (toward the image reader and the contact glass). If the urging force is too great, the cable may be broken by the urging force or sustain a lot of load on a connection portion of the cable to the image reader.

The cable has a U-shaped curved portion in side view because it extends from a controller, being flipped 180 degrees upward and connected to the image reader. When the document reader is left unused for a long period of time, the curved portion of the cable may remain. If the curved portion of the cable remains, even when the image reader moves, the cable may be liable to slide while maintaining the shape of the curved portion.

In this case, if an impact is given to the document reader, for example, during transportation of the document reader, the image reader may be caused to move by the impact. Accordingly, the cable may slidingly move while maintaining the shape of the curved portion, and thus a portion of the cable, which has originally extended straightly, may move and bulge upward. If the image reader is further left unused for a long time of period with cable having an upward bulge, a bend having the shape of the upward bulge may remain in the cable. Once such a bend remains in the cable, the movement of the image reader may be limited by the bend of the cable, adversely affecting document reading. In addition, in accordance with the movement of the image reader, the bend in the cable may contact the contact glass, flaws may occur in the contact glass, and document reading quality may be degraded.

Aspects of the invention may provide an image reading apparatus and an image forming apparatus, each including an image reader configured to read an image of a document received on a document receiving portion while moving in a predetermined direction, wherein a cable connected to the image reader can change its shape appropriately and stably, along with the movement of the image reader, with a simple structure.

BRIEF DESCRIPTION OF THE DRAWINGS

Illustrative aspects of the disclosure will be described in detail with reference to the following figures in which like elements are labeled with like numbers and in which.

DETAILED DESCRIPTION

An illustrative embodiment of the invention will be described in detail with reference to the accompanying drawings. An image reading apparatus and an image forming apparatus according to illustrative aspects of the invention are employed in a multifunction apparatus 1 including an image reading unit, e.g., a scanner unit 30.

The general structure of an illustrative multifunction apparatus 1 will be described with reference to FIGS. 1 and 2.

For ease of discussion, in the following description, the top or upper side, the bottom or lower side, the left or left side, the right or right side, the front or front side, and the rear or rear side are used to define the various parts when the multifunction apparatus 1 is disposed in an orientation in which it is intended to be used. In FIG. 1, the lower right side is referred to as the front or front side, the upper left side is referred to as the rear or the rear side, the up side is referred to as the top or upper side, the down side is referred to as the bottom or lower side, the lower left side is referred to as the left or left side, and the upper right side is referred to as the right or right side.

Figure 1:
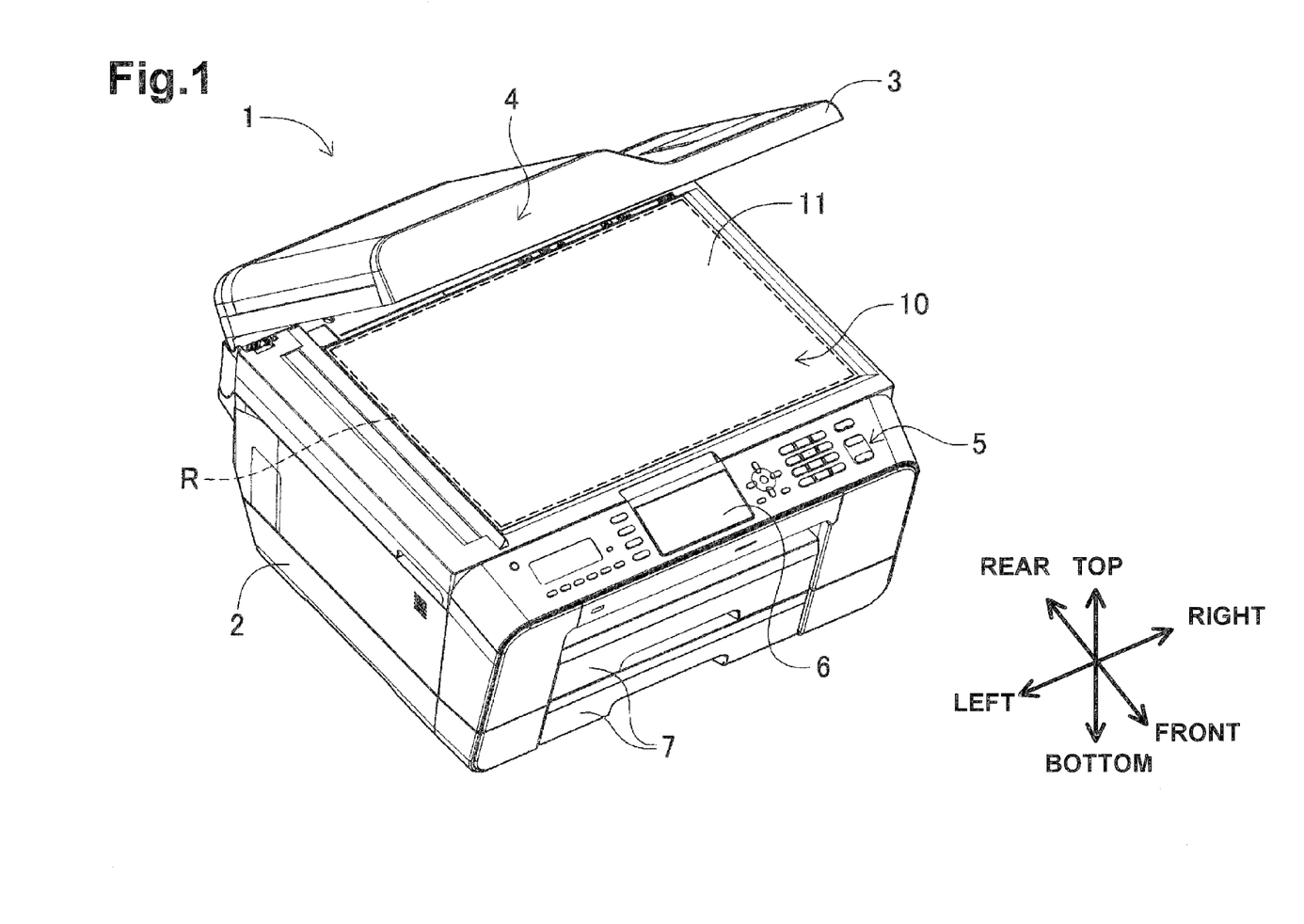
FIG. 1 is a perspective view of a multifunction apparatus according to an illustrative embodiment of the invention.

As shown in FIG. 1, the multifunction apparatus 1 includes a main body 2 and an upper cover 3. The main body 2 includes a document receiving portion 10 on the top surface. The document receiving portion 10 is made up of a contact glass 11. The contact glass 11 may be referred to as a platen glass, and is shaped in a rectangle slightly greater than A3 size, in which the long side extends along the right and left direction of the main body 2. The contact glass 11 can be used when an image sensor 31 of the scanner unit 30 moves to read an image of a document received on the contact glass 11.

The main body 2 includes a controller 20, a facsimile unit 21, an image forming unit 22, a communication interface (I/F) 23, and the scanner unit 30. Specifically, the main body 2 includes the scanner unit 30 under the contact glass 11 inside an upper portion of the main body 2 (see FIGS. 3-8). The scanner unit 30 includes the image sensor 31, a slide shaft 32, a motor 33, a cable (e.g., flat cable 40), and a film 45, and is configured to read an image of a document placed on the contact glass 11. In the main body 2, the controller 20, the facsimile unit 21, image forming unit 22, and the communication I/F 23 can be located under the scanner unit 30.

An upper front surface of the main body 2 contains an operation panel 5 and a liquid crystal display (LCD) 6. The operation panel 5 can be used to receive user input of various instructions to the multifunction apparatus 1. The LCD 6 displays various types of information regarding the multifunction apparatus 1 and notifies users of contents of the information.

The main body 2 further includes a sheet supply cassette 7 which is detachably attachable to the front of the main body 2. The sheet supply cassette 7 stores a stack of recording sheets. The recording sheets can be used for image formation by the image forming unit 22.

The upper cover 3 is disposed on the top surface of the main body 2 and is configured to pivot on a rear end of the top surface of the main body 2. When the upper cover 3 is closed, the top surface of the main body 2, that is, the contact glass 11 of the document receiving portion 10, is covered. Thus, the upper cover 3 is configured to fix a document in position on the contact glass 11.

The upper cover 3 includes an automatic document feeder (ADF) 4. The ADF 4 is disposed on the left side of the upper cover 3 and configured to successively and singly at a time feed documents in a document tray (not shown) through a predetermined conveying path and eject them to an ejection tray (not shown). The multifunction apparatus 1 is configured to read an image of a document by the scanner unit 30 while the document is fed by the ADF 4.

The control system of the multifunction apparatus 1 will be described with reference to FIG. 2.

Figure 2:
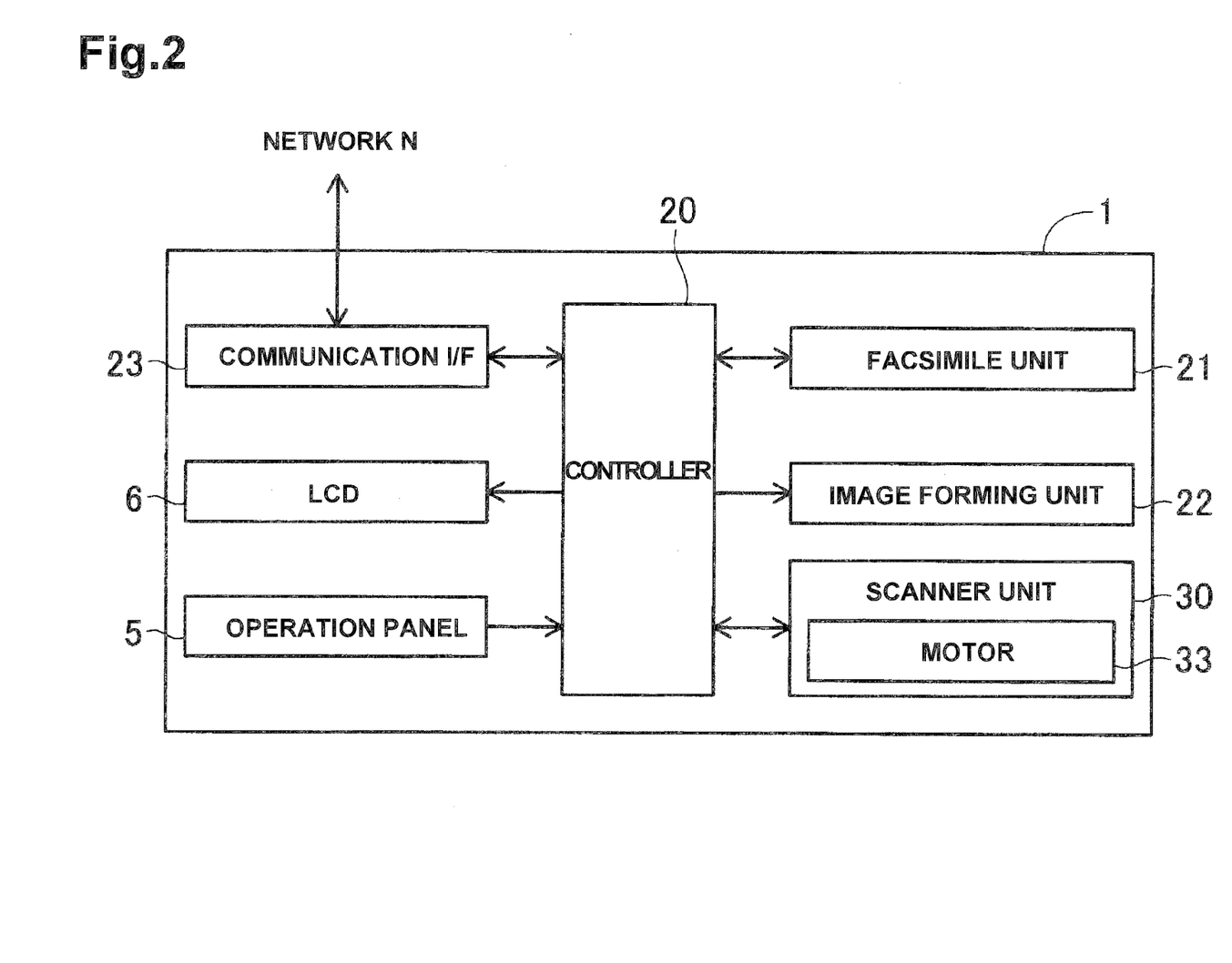
FIG. 2 is a block diagram of a control system of the multifunction apparatus.

As shown in FIG. 2, the multifunction apparatus 1 includes the controller 20, the facsimile unit 21, the image forming unit 22, the communication I/F 23 and the scanner unit 30. The controller 20 includes a central processing unit (CPU), a read only memory (ROM), and a random access memory (RAM), and serves as the nerve center of the control system regarding each function of the multifunction apparatus 1.

The facsimile unit 21 is configured to fax an image of a document read by the scanner unit 30 to a destination via network N. The facsimile unit 21 is also configured to receive facsimile data via the network N. As the controller 20 controls the image forming unit 22, the received facsimile data is output or printed to a recording sheet fed from the sheet supply cassette.

The image forming unit 22 is configured to output or print image data, which is input based on the control by the controller 20, to a recording sheet fed from the sheet supply cassette 7. The multifunction apparatus 1 performs a copy function for image data based on the image read by the scanner unit 30 by controlling the image forming unit 22. In addition, the multifunction apparatus 1 performs a printing function for printing data input via the network N by controlling the image forming unit 22.

The communication I/F 23 is an interface for data communications via the network N. The communication I/F 23 is used for facsimile transmission and reception based on the control by the controller 20. As shown in FIG. 2, the controller 20 is connected to the operation panel 5 and the LCD 6. Thus, the controller 20 is capable of controlling what a user requests based on the user's input operation to the operation panel 5. The controller 20 causes the LCD 6 to display various types of information based on the user's input operation to the operational panel 5 and calculating results.

The structure of the scanner unit 30 in the multifunction apparatus 1 will be described with reference to mainly FIG. 3.

As described above, the scanner unit 30 includes the image sensor 31, the slide shaft 32, the motor 33, and the flat cable 40, and is disposed in an upper portion of the main body 2 and under the contact glass 11.

In the main body 2, the scanner unit 30 may be disposed in an area partitioned off from the facsimile unit 21 and the image forming unit 22 by the scanner bottom surface 50.

As shown in FIGS. 3-8, the image sensor 31 may be a so-called contact image sensor, CIS, and configured to read an image of a document on the contact glass 11. The image sensor 31 has a reading range whose length corresponds to the short side of the A3 size in the main scanning direction (that is, the front-rear direction in the main unit 5).

Figure 3:
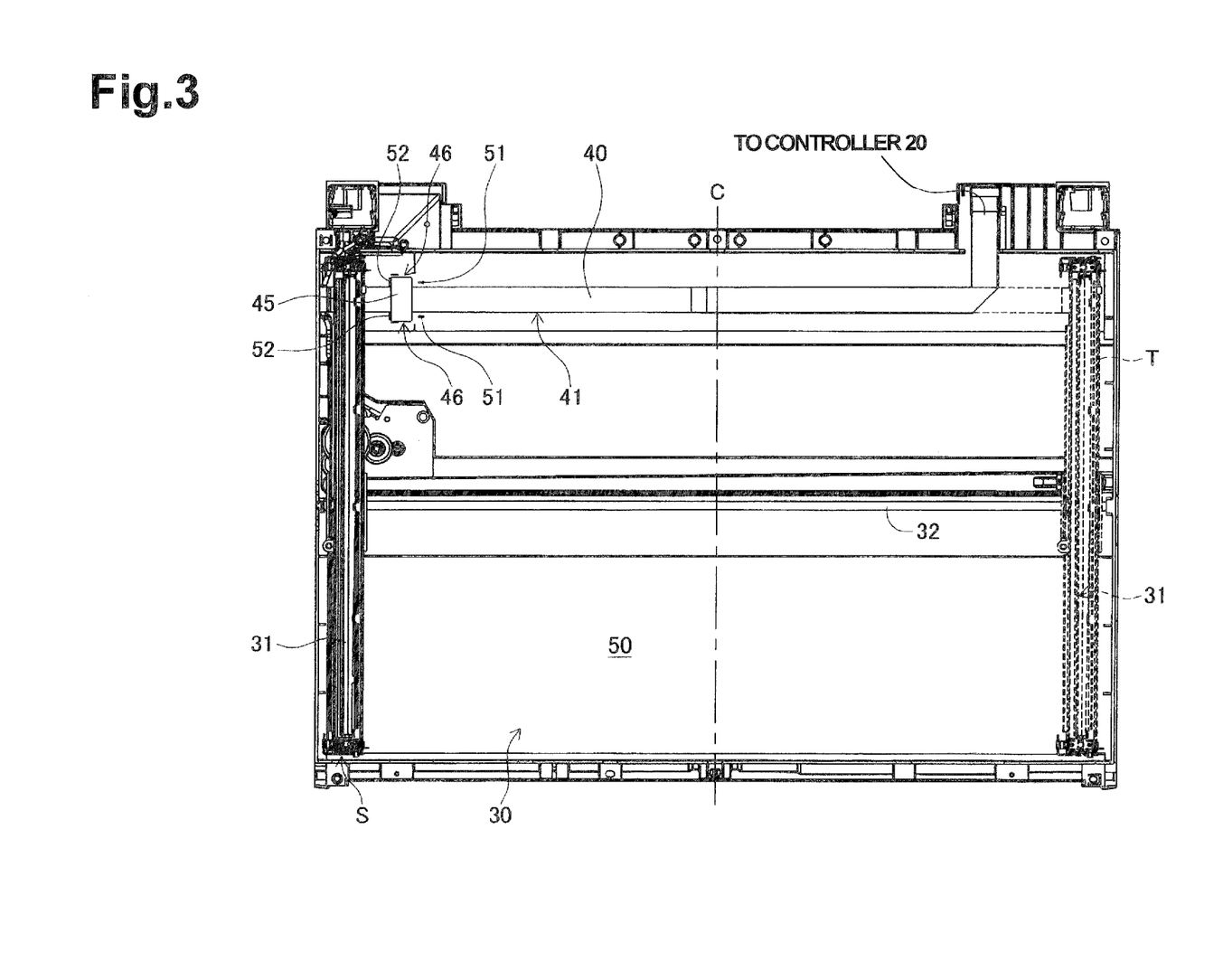
FIG. 3 is a top view illustrating a structure of a scanner unit.
Figure 8:
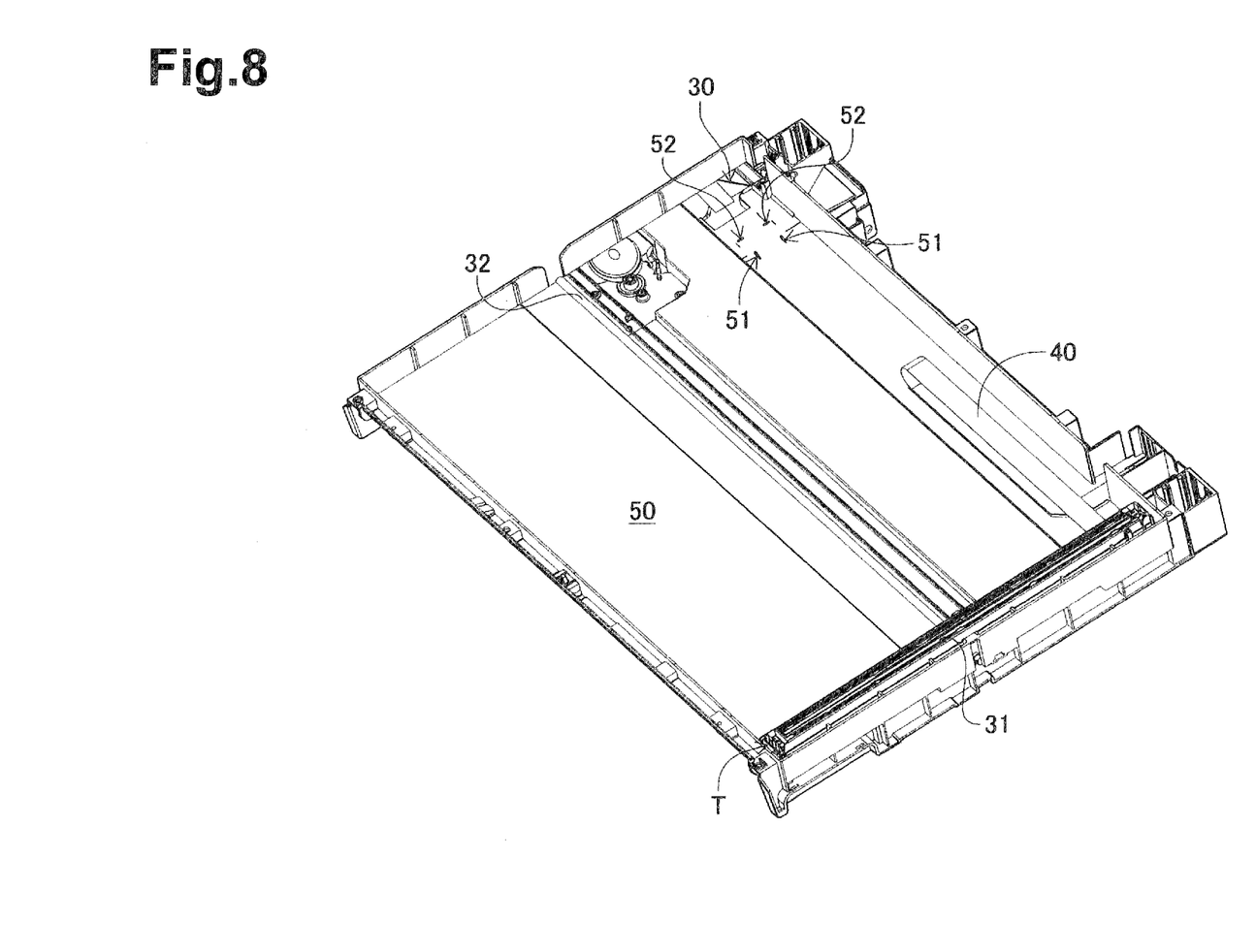
FIG. 8 is a perspective view illustrating the flat cable when the image sensor is in the final position.

As shown in FIGS. 3 and 8, the slide shaft 32 extends in the right-left direction in the main body 2, and holds the image sensor 31 such that the image sensor 31 is slidable in the right-left direction. The motor 33 is configured to slidably move the image sensor 31 along the slide shaft 32 via a drive mechanism (e.g., a pulley and belt mechanism) based on the drive control by the controller 20.

The image sensor 31 may be normally positioned in a first position, e.g. a standby position S (so-called home position) located under the left end portion of the contact glass 11. The image sensor 31 may be slidable along the under surface of the contact glass 11 in a range between the standby position S and a second position, e.g. a final position T, which is separated from the standby position S by a distance corresponding to the long side of A3 size. The image sensor 31 is configured to read an image of a document on the contact glass 11 while moving in a moving direction M from the standby position S to the final position T. Thus, in this example the scanner unit 30 has a maximum reading range R corresponding to A3 size, and can read an image of a document of a size smaller than or equal to A3 size.

The flat cable 40 is a flexible flat cable having a width F (refer to FIGS. 3-8), and is used for supplying electricity to the image sensor 31 and transmitting reading results of the image sensor 31 to the controller 20. As shown in FIG. 3, the flat cable 40 is disposed in a rearward position of the main body 2 and extends in the right and left direction of the main body 2. As shown in FIGS. 3-8, one end of the flat cable 40 is connected to the left side surface of the image sensor 31 in the rearward position of the main body 2, and the other end of the flat cable 40 is connected to the controller 20 in the right rearward position of the main body 2 via the scanner bottom surface 50. Thus, the other end of the flat cable 40 connected to the controller 20 is located under and close to the final position T of the scanner unit 30.

When the image sensor 31 is in the standby position S, the flat cable 40 extends in the right and left direction of the main body 2 along the scanner bottom surface 50 as shown in FIG. 3. On the left side of the image sensor 31, the flat cable 40 is bent in an arc connecting the left side of the image sensor 31 and the scanner bottom surface 50 (see FIGS. 4A-7). In this illustrative embodiment, when the image sensor 31 is in the standby position, the flat cable 40 has an area extending along the scanner bottom surface 50 in the right and left direction of the main body 2, which is hereinafter referred to as an extension portion 41.

Figure 4A:
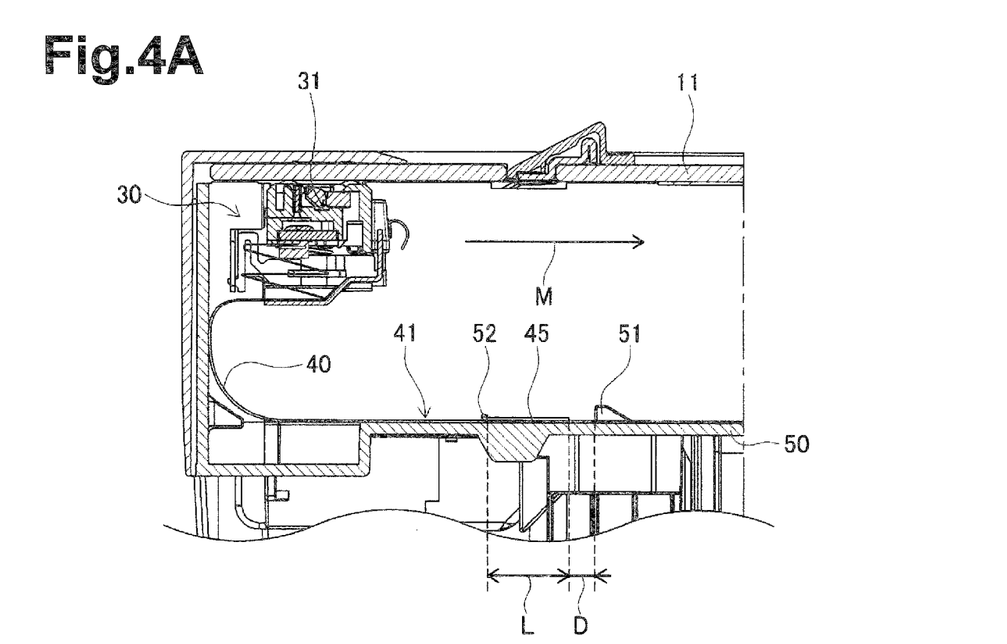
FIGS. 4A and 4B illustrate a flat cable when an image sensor is in a standby position.
Figure 4B:
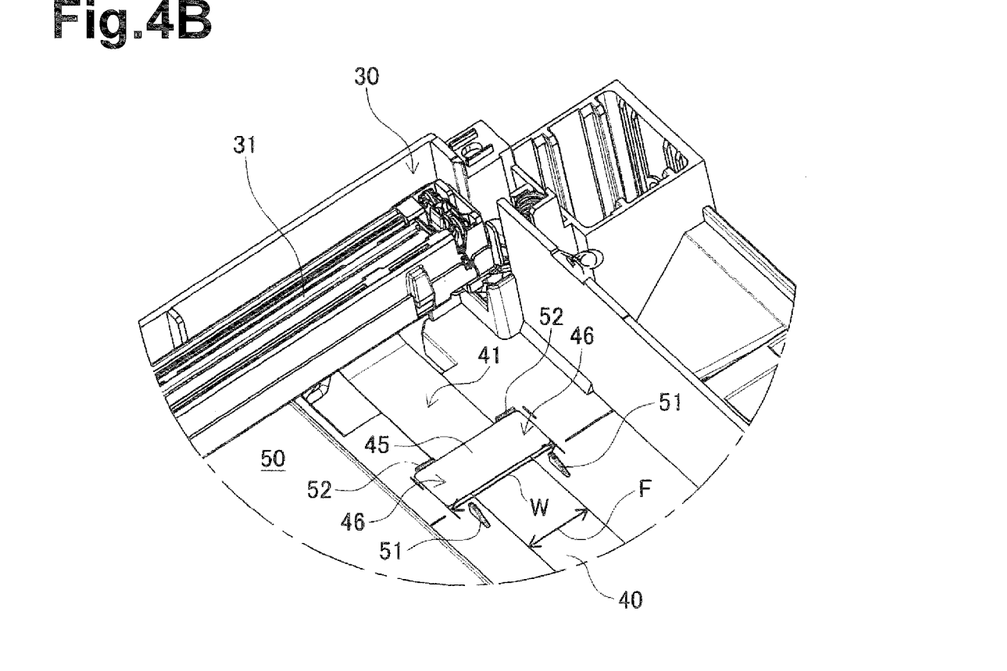

As shown in FIGS. 4A and 4B, a film 45 is affixed to a predetermined position of the flat cable 40 such that protrusions 46 are formed on both sides of the flat cable 40. The film 45 is substantially rectangular in shape in which the long side of the film 45 is a width W and the short side of the film 45 is a length L. In the illustrative embodiment, the film 45 is affixed to the upper surface of the flat cable 40 such that the long side of the film 45 extends along the width of the flat cable 40 to form the protrusions 46. As shown in FIG. 4B, the width W of the film 45 is greater than a width F of the flat cable 40. By aligning the center of the width F of the film 45 with the center of the width L of the flat cable 40, the protrusions 46 can be equally formed on each side of the flat cable 40 in its width direction for a predetermined distance ((width W−width F)/2).

Regulation ribs 51 and positioning ribs 52 are disposed on the scanner bottom surface 50. The regulation ribs 51 are located in predetermined positions between the standby position S and the final position T which define both ends of the maximum reading range R, and extend along a direction where the extension portion 41 of the flat cable 40 extends. The regulation ribs 51 are disposed on both sides of the flat cable 40 in the width direction. Specifically, as shown in FIG. 3, the regulation ribs 51 are disposed closer to the standby position S than a center position C of the maximum reading range R in the right and left direction. More specifically, the regulation ribs 51 are disposed close to the standby position S in a most left-side quarter of the maximum reading range R. Thus, when the image sensor 31 moves in the direction M from the standby position S toward the final position T, the regulation ribs 51 are configured to guide the flat cable 40 to an appropriate position in contact with the protrusions 46 and to reduce the potential of the flat cable 40 moving upward toward the contact glass 11.

As shown in FIGS. 4A and 4B, the positioning ribs 52 are spaced from ends of the regulation ribs 51 on the standby-position-S side by a predetermined distance (corresponding to the sum of the film length L and a gap D) in a direction toward the standby position S. The positioning ribs 52 stand extending along the width of the flat cable 40. When the image sensor 31 is in the standby position S, the positioning ribs 52 are disposed on both sides of the flat cable 40 respectively such that the flat cable 40 passes between the positioning ribs 52. The positioning ribs 52 are used for affixing the film 45 to the upper surface of the flat cable 40. Specifically, when the image sensor 31 is in the standby position S, the film 45 is affixed to the flat cable 40 by aligning the long-side-end of the film 45 in contact with the positioning ribs 52. In this manner, the film 45 can be affixed in a predetermined position to the flat cable 40 and the protrusions 46 can be formed in the predetermined position of the flat cable 40.

The movement of the flat cable 40 when the image sensor 31 moves in the moving direction M will be described with reference to figures. In the following description, it is assumed that the flat cable 40 has an arc-shaped curved portion created and remaining in a portion connected to the image sensor 31 because of being left unused for more than a specified period of time.

As shown in FIGS. 4A and 4B, when the image sensor 31 is in the standby position S, the flat cable 40 is located between the regulation ribs 51 and between the positioning ribs 52, and along the scanner bottom surface 50. Thus, the regulation ribs 51 and the positioning ribs 52 are located in predetermined positions in a range of the extension portion 41. When the image sensor 31 is in the standby position S, the film 45 is located along ends, closer to the final position T, of the positioning ribs 52. As shown in FIG. 4A, there is a gap D between the film 45 and the regulation ribs 51.

Figure 5A:
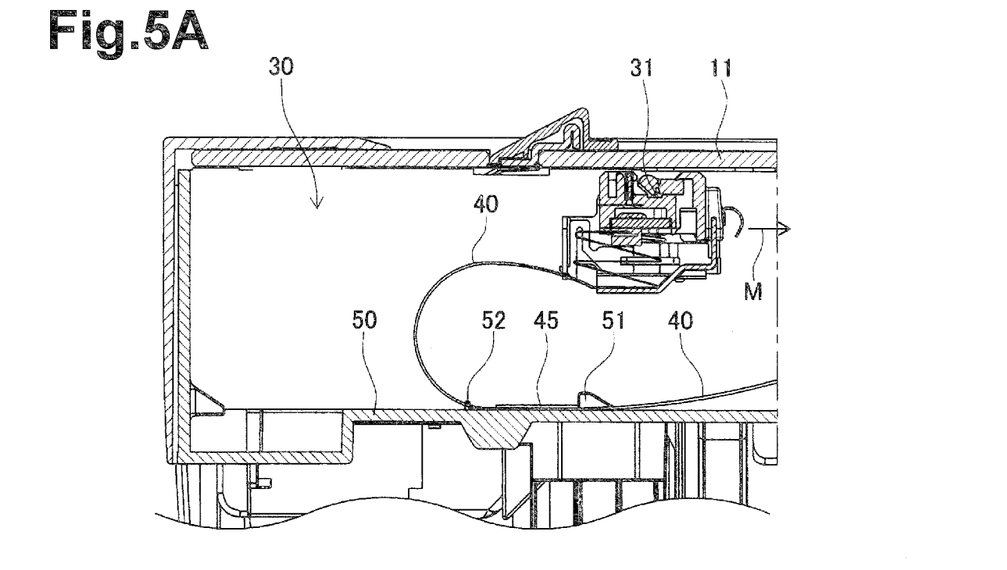
FIGS. 5A and 5B illustrate the flat cable when protrusions of the flat cable contact regulation ribs.
Figure 5B:
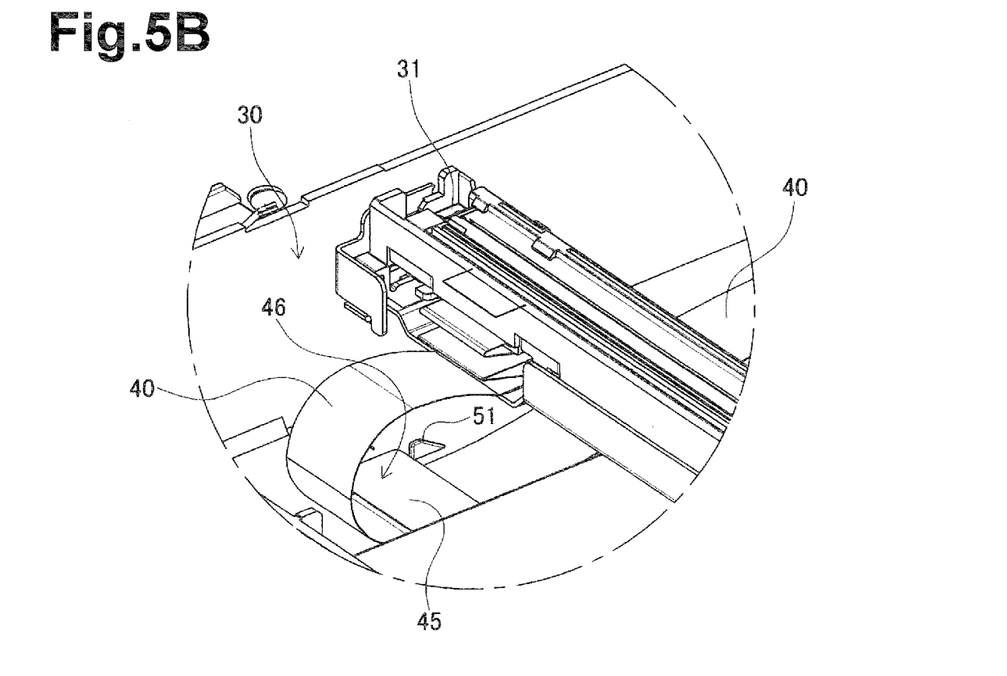

When the image sensor 31 moves in the direction M from the state shown in FIGS. 4A and 4B toward the final position T, the film 45 attached to the flat cable 40 moves by a distance corresponding to the gap D, and the protrusions 46 contact the ends of the regulation ribs 51 (see FIGS. 5A and 5B). As the flat cable 40 has an arc-shaped curved portion remaining in the portion connected to the image sensor 31, the flat cable 40 maintains the arc-shaped curved portion while slidingly moving in the direction M as illustrated in FIGS. 4A, 4B, 5A, and 5B.

Figure 6A:
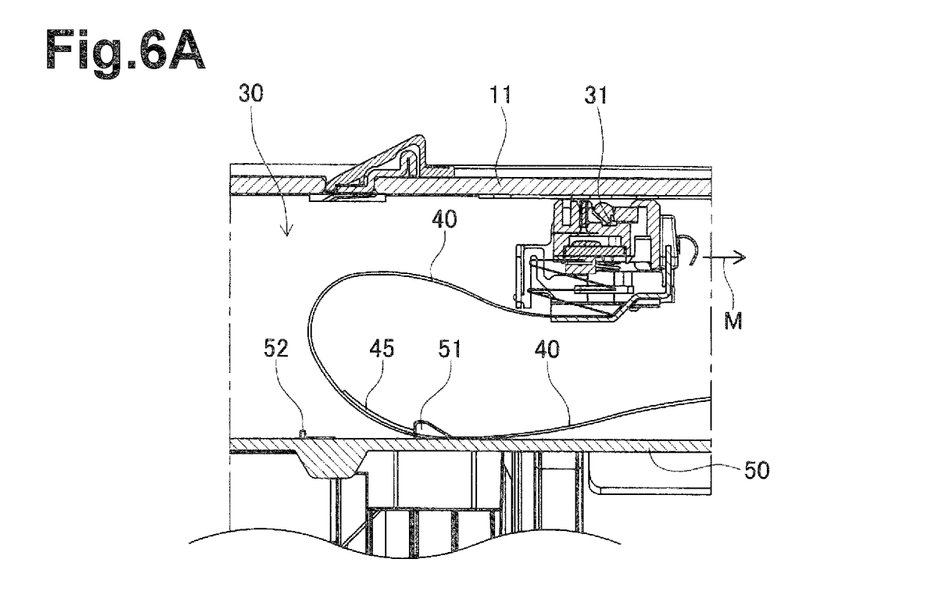
FIGS. 6A and 6B illustrate the flat cable when the image sensor moves further in a moving direction from the state shown in FIGS. 5A and 5B.
Figure 6B:
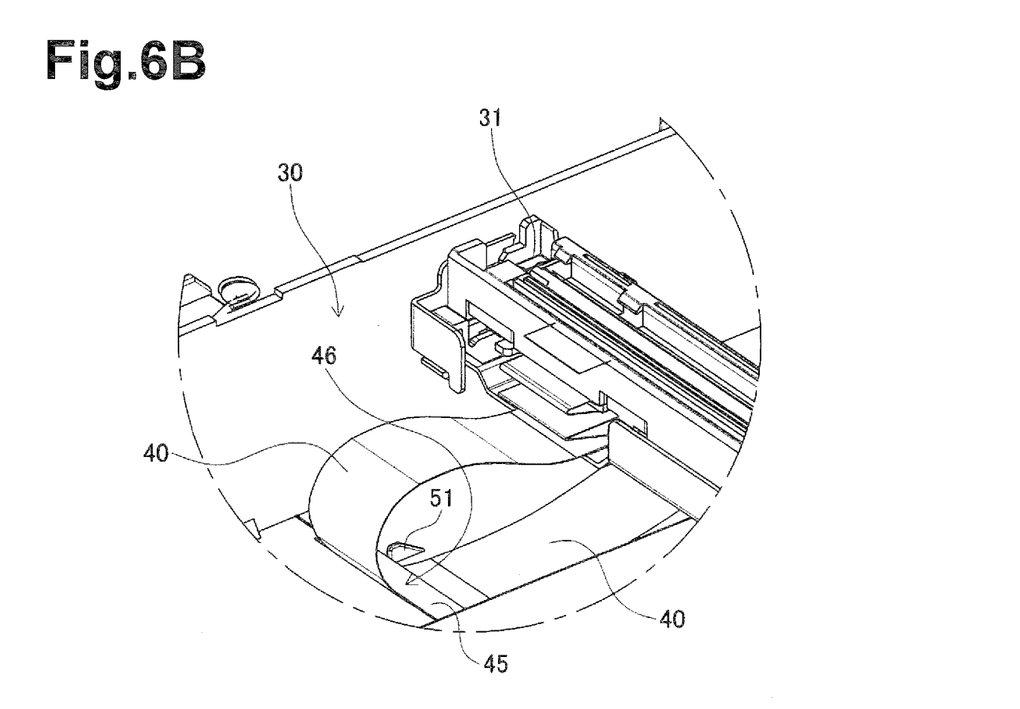

When the image sensor 31 further moves in the direction M from the state where the protrusions 46 are in contact with the regulation ribs 51, the film 45 rotates such that it is pulled upward relative to a contact portion between the film 45 and the regulation ribs 51 (see FIGS. 6A and 6B). The flat cable 40 follows the rotation of the film 45. Thus, even when the flat cable 40 has the curved portion remaining in the portion connected to the image sensor 31, the flat cable 40 does not slidingly move in the direction M while maintaining the shape of the curved portion. The flat cable 40 moves to follow the movement of the image sensor 31 in the direction M.

Figure 7A:
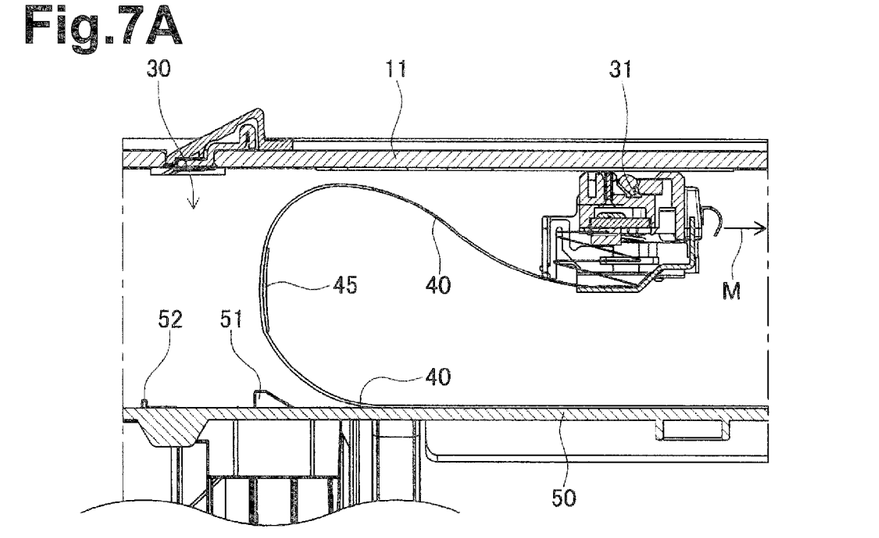
FIGS. 7A and 7B illustrate the flat cable when the image sensor further moves in the moving direction from the state shown in FIGS. 6A and 6B.
Figure 7B:
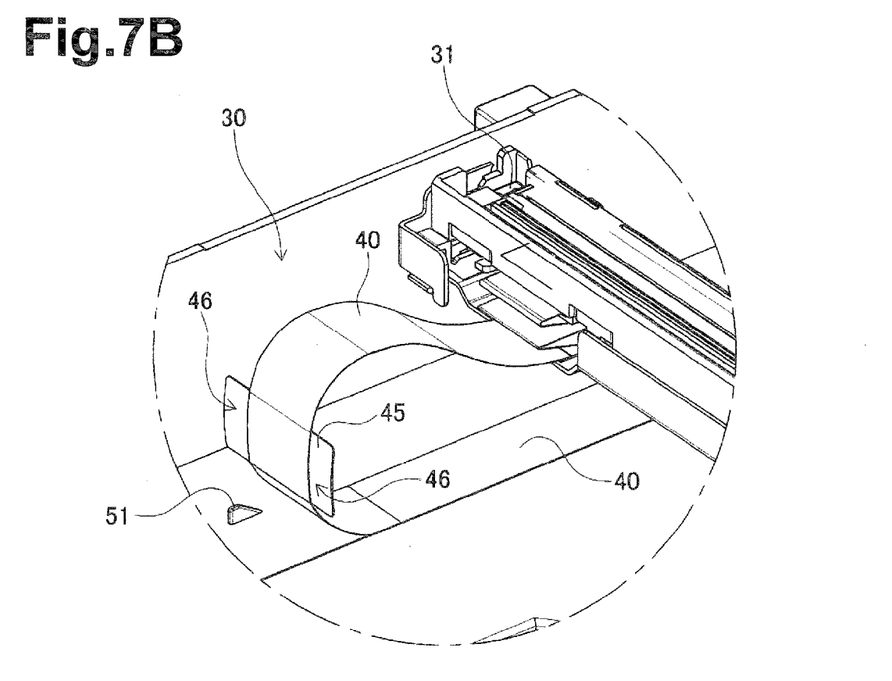

When the image sensor 31 further moves in the direction M from the state shown in FIGS. 6A and 6B, the film 45 moves past the regulation ribs 51 in accordance with the rotation relative to the contact portion between the film 45 and the regulation ribs 51 (see FIGS. 7A and 7B). In other words, even when the curved portion remains in the flat cable 40 near the portion connected to the image sensor 31, the curved portion moves to a location close to the image sensor 31 and the undersurface of the contact glass 11. After that, when the image sensor 31 moves in the direction M, the flat cable 40 moves to follow the movement of the image sensor 31.

As described above, the film 45 is affixed to the upper surface of flat cable 40 located on the scanner bottom surface 50. Thus, when the flat cable 40 moves to a location close to the under surface of the contact glass 11 in accordance with the movement of the image sensor 31 in the direction M, the flat cable 40 is located between the contact glass 11 and the film 45. Thus, the film 45 does not contact the under surface of the contact glass 11 thereby avoiding potential damage to the contact glass 11.

When the image sensor 31 moves to the final position T from the state shown in FIGS. 7A and 7B, the flat cable 40 enters a state as shown in FIG. 8. Specifically, when the image sensor 31 is in the final position T, the flat cable 40 extends from a position close to a connection portion with the controller 20, which is disposed under the scanner bottom surface 50 in the vicinity of the final position T, toward the standby position S along the scanner bottom surface 50, and the flat cable 40 draws, in the vicinity of the center position C, an arc connecting the scanner bottom surface 50 and the proximity of the under surface of the contact glass 11. The flat cable 40 further extends along the under surface of the contact glass 11 from the proximity of the center position C toward the image sensor 31 in the final position T in spaced parallel relation to the flat cable extending along the scanner bottom surface 50.

When the image sensor 31 moves from the standby position S to the final position T, the flat cable 40 can change its shape appropriately and stably along with the movement of the image sensor 31 by cooperation between the protrusions 46 of the film 45 affixed to the flat cable 40 and the regulation ribs 51. Thus, the multifunction apparatus 1 can reduce potential damage to the contact glass 11 due to buckling of the flat cable 40 against the contact glass 11 and reduce the potential for a reading error resulting from the flat cable 40 hindering the movement of the image sensor 31.

After the image sensor 31 moves to the final position T, the multifunction apparatus 1 returns the image sensor 31 to the standby position S by slidingly moving the image sensor 31 in a direction opposite to the direction M. At this time, the flat cable 40 passes between the regulation ribs 51 and between the positioning ribs 52 in accordance with the movement of the image sensor 31 and extends on the scanner bottom surface 50 in parallel to the right and left directions of the main body 2.

When the image sensor 31 is in the standby position S, the film 45 is affixed to the flat cable 40 using the positioning ribs 52 such that the film 45 is separated from the ends, closer to the standby position S, of the regulation ribs 51 by the gap D. Thus, when the image sensor 31 returns to the standby position S, the film 45 passes over the upper ends of the regulation ribs 51 and moves toward the standby position S. That is, when the multifunction apparatus 1 returns the image sensor 31 to the standby position S, the film 45 is not caught by the regulation ribs 51, and the flat cable 40 can change its shape appropriately and stably along with the movement of the image sensor 31.

As described, in the multifunction apparatus 1 and the scanner unit 30 according to the above illustrative embodiment, the image sensor 31 reads an image of a document on the contact glass 11 while moving along the under surface of the contact glass 11 constituting the document receiving portion 10 in the direction M between the standby position S and the final position T. The flat cable 40 is fixed to the scanner bottom surface 50 and connected to the controller 20 at one end and connected to the left side surface of the image sensor 31 at the other end. The flat cable 40 includes the pair of protrusions 46 protruding outward from the flat cable 40 relative to the width thereof in the predetermined position included in the extension portion 41.

The regulation ribs 51 are provided on the scanner bottom surface 50 in a position, when the image sensor 31 is in the standby position S, closer to the final position T than the pair of protrusions 46 and outside the flat cable 40 in the width direction. The regulation ribs 51 regulate the sliding movement of the flat cable 40 along the scanner bottom surface 50 by contacting the pair of protrusions 46 when the image sensor 31 moves in the direction M (see FIGS. 5A and 5B). When the image sensor 31 further moves in the direction M from the state where the pair of protrusions 46 contact the regulation ribs 51, the flat cable 40 rotates upward relative to the contact position where the pair of protrusions 46 contact the regulation ribs 51, following the movement of the image sensor 31 to the final position T (see FIGS. 6-8). Thus, according to the multifunction apparatus 1 and the scanner unit 30, the flat cable 40 connected to the image sensor 31 can change its shape appropriately and stably along with the movement of the image sensor 31, with a simple structure including the pair of protrusions 46 of the flat cable 40 and the regulation ribs 51 on the scanner bottom surface 50. In addition, according to the multifunction apparatus 1 and the scanner unit 30, even when the flat cable 40 is bent in the portion connected to the image sensor 31, the flat cable 40 can change its shape appropriately and stably along with the movement of the image sensor 31, thereby maintaining image reading quality and eliminating failure factors.

When the image sensor 31 is in the standby position S, the gap D is provided between the pair of protrusions 46 and the regulation ribs 51. Thus, when the image sensor 31 returns to the standby position S, the film 45 moves to the standby position S while passing above the regulation ribs 51. According to the multifunction apparatus 1 and the scanner unit 30, when the image sensor 31 returns to the standby position S, the film 45 is not caught by the regulation ribs 51 and the flat cable 40 can change its shape appropriately and stably along with the movement of the image sensor 31. The multifunction apparatus 1 and the scanner unit 30 can return the image sensor 31 to the standby position S without being restricted by the flat cable 40 and the regulation ribs 51.

The pair of protrusions 46 are formed by affixing the film 45, whose width W is longer than the width F of the flat cable 40, to the upper surface of the flat cable 40. Thus, according to the multifunction apparatus 1 and the scanner unit 30, the pair of protrusions 46 can be formed with a simple structure and operation. Thus, in order to allow the flat cable 40 connected to the image sensor 30 to change its shape along with the movement of the image sensor 31, the multifunction apparatus 1 and the scanner unit 30 may be embodied with a simple operation. As the film 45 is affixed to the upper surface of the flat cable 40, the potential of the film 45 contacting the under surface of the contact glass 11 when the image sensor 31 moves to the final position T can be reduced.

The positioning ribs 52 are formed to protrude upward from the scanner bottom surface 50. The end of each positioning rib 52 on the final-position-T side is spaced away from the end of a corresponding regulation rib 51 by the distance corresponding to the sum of the film length L and the gap D in the direction toward the standby position S (see FIG. 4A). Thus, according to the multifunction apparatus 1 and the scanner unit 30, a pair of protrusions 46 is formed by aligning the end of the film 45 in contact with the end of the positioning rib on the final-position-T side and affixing the film 45 to the flat cable 40, which can obtain the gap D between the regulation rib 51 and the film 45.

The illustrative embodiment shows, but the disclosure is not limited to, the multifunction apparatus 1 that provides for scanning, copying, printing and faxing capabilities. An apparatus having at least scanning capability may additionally include and/or omit other capabilities.

The illustrative embodiment shows, but the disclosure is not limited to, that the pair of protrusions 46 is formed by affixing the film 45 to the flat cable 40. Instead, the flat cable 40 and protrusions may be integrally covered with a sheath of, for example, rubber. Alternatively, a single protrusion 46 may be provided to the flat cable 40 so as to protrude therefrom outward in the width direction of the flat cable 40. In this case, instead of the restriction ribs 51, a single protrusion, such as a boss or a step, may be provided on the bottom surface 50 in association with the single protrusion 46. Alternatively, instead of the film 45, a member, such as a pin or plate, may be used to form the protrusion(s).

The illustrative embodiment shows, but the disclosure is not limited to, that the positioning ribs 52 are used as the marker to affix the film 45 to the flat cable 40. For example, marking-off lines may be scribed on the scanner bottom surface 50 as lines required for positioning the film 45. Additionally, the positioning ribs 52 and marking off lines for affixing the film 45 may be provided on the scanner bottom surface 50.

Although an illustrative embodiment and examples of modifications of the present invention have been described in detail herein, the scope of the invention is not limited thereto. It will be appreciated by those skilled in the art that various modifications may be made without departing from the scope of the invention. Accordingly, the embodiment and examples of modifications disclosed herein are merely illustrative. It is to be understood that the scope of the invention is so limited, but is to be determined by the claims which follow.

What is claimed is:

1. An image reading apparatus comprising:
    a main body including a document receiving portion configured to receive a document from which an image is to be read;
    an image reader configured to move, along an under surface of the document receiving portion, between a first position located below a first end of the document receiving portion and a second position located below a second end, opposite to the first end, of the document receiving portion, the image reader being configured to read the image of the document received on the document receiving portion while moving in a predetermined direction;
    a controller disposed in the main body and configured to control image reading operations of the image reader;
    a cable having a first end fixed to a bottom surface of the main body below the second position and connected to the controller, and a second end connected to the image reader, wherein the cable includes an extension portion extending along the bottom surface of the main body in a direction parallel to a moving direction of the image reader when the image reader is in the first position; and
    a pair of protrusions in predetermined positions on the extension portion, one of the pair of protrusions protruding outward from one side of the cable in a width direction thereof and the other one of the pair of protrusions protruding outward from the other side of the cable in the width direction,
    wherein a regulation protrusion protrudes upward to a predetermined height from the bottom surface of the main body and is disposed in a position that is closer to the first position than the second position, and
    wherein the regulation protrusion is disposed outside the cable in the width direction such that no portion of the regulation protrusion overlaps the cable as viewed in a direction perpendicular to both the width direction of the cable and the moving direction of the image reader, and further such that, when the image reader moves toward the second position, the regulation protrusion regulates parallel movement of the pair of protrusions along the bottom surface of the main body and allows at least one of the pair of protrusions to move past an upper portion of the regulation protrusion in the moving direction of the image reader.

2. The image reading apparatus according to claim 1, wherein the regulation protrusion includes a rib.

3. The image reading apparatus according to claim 1, wherein, when the image reader is in the first position, there is a gap of a predetermined distance between the at least one of the pair of protrusions and the regulation protrusion.

4. The image reading apparatus according to claim 1,
    wherein when the image reader moves toward the second position, the cable moves in parallel along the bottom surface, and the at least one of the pair of protrusions contacts the regulation protrusion, and
    wherein, when the image reader moves further toward the second position from a state where the at least one of the pair of protrusions contacts the regulation protrusion, the at least one of the pair of protrusions rotates upward about a contact point where the at least one of the pair of protrusions contacts the regulation protrusion, and breaks contact with the regulation protrusion allowing the cable to follow movement of the image reader toward the second position.

5. The image reading apparatus according to claim 1, further comprising a film that is affixed to a surface of the cable, the film including the pair of protrusions and having a longer width than the cable.

6. The image reading apparatus according to claim 5, further comprising:
    a positioning member provided on the bottom surface of the main body and configured to function as a marker, wherein the film is affixed to the surface of the cable relative to the positioning member,
    wherein the positioning member is disposed in a position separated from an end of the regulation protrusion in a direction toward the first position by a sum of a gap between the at least one of the pair of protrusions and the regulation protrusion and a dimension of the film along a direction where the cable extends.

7. The image reading apparatus according to claim 6,
    wherein the positioning member includes a rib protruding upward from the bottom surface of the main body, and
    wherein the rib is disposed such that an end of the rib facing the second position is spaced away from the end of the regulation protrusion in a direction toward the first position by the sum of the gap between the at least one of the pair of protrusions and the regulation protrusion and the dimension of the film along the direction where the cable extends.

8. An image reading apparatus comprising:
    a document receiving portion configured to receive a document from which an image is to be read;
    an image reader configured to move between a first position located at a first end of the document receiving portion and a second position located at a second end, opposite to the first end, of the document receiving portion, the image reader being configured to read the image of the document received on the document receiving portion while moving in a predetermined direction;
    a cable having one end connected to the image reader;
    a first cable protrusion having a portion disposed on a surface of the cable, the first cable protrusion protruding outward from the cable in a width direction of the cable;
    a cable receiving member having a cable receiving surface configured to receive the cable; and a first regulation protrusion protruding upward to a predetermined height from the cable receiving surface and disposed in a position closer to the first position than second position, as viewed in the width direction of the cable, and wherein the first regulation protrusion is disposed outside the cable in the width direction such that no portion of the first regulation protrusion overlaps the cable as viewed in a direction perpendicular to both the width direction of the cable and the predetermined direction of the image reader, and further such that, when the image reader moves in the predetermined direction from the first position to the second position, the first regulation protrusion regulates parallel movement of the first cable protrusion along the cable receiving surface in the predetermined direction, and allows the first cable protrusion to move past an upper portion of the first regulation protrusion in the predetermined direction of the image reader.

9. The image reading apparatus according to claim 8, wherein the first regulation protrusion includes a rib.

10. The image reading apparatus according to claim 8, wherein, when the image reader further moves in the predetermined direction from a state where the first cable protrusion contacts the first regulation protrusion, the first cable protrusion moves away from the cable receiving surface and the first regulation protrusion.

11. The image reading apparatus according to claim 8, further comprising a second cable protrusion having a portion disposed on a surface of the cable, the second cable protrusion protruding outward from the cable in a direction opposite to the first cable protrusion, wherein the first cable protrusion, the second cable protrusion and the first regulation protrusion are configured such that, when the image reader moves in the predetermined direction from the first position to the second position, the first cable protrusion and the second cable protrusion move a predetermined distance in the predetermined direction and at least one of the first cable protrusion and the second cable protrusion contacts the first regulation protrusion, and the first regulation protrusion regulates a further movement of the first cable protrusion and the second cable protrusion in the predetermined direction.

12. The image reading apparatus according to claim 11, further comprising a film having a longer width than that of the cable, wherein the film is fixed to the cable, and includes the first cable protrusion and the second cable protrusion.

13. The image reading apparatus according to claim 11, further comprising a second regulation protrusion protruding from the cable receiving surface in a position opposite to the first regulation protrusion, wherein, when the image reader is in the first position, the cable passes between the first regulation protrusion and the second regulation protrusion, and the first regulation protrusion and the second regulation protrusion are spaced apart from the first cable protrusion and the second cable protrusion, respectively, by the predetermined distance, and wherein, when the image reader moves in the predetermined direction from the first position, the first cable protrusion and the second cable protrusion move by the predetermined distance in the predetermined direction and contact the first regulation protrusion and the second regulation protrusion, respectively.

14. The image reading apparatus according to claim 13, wherein, when the image reader moves in the predetermined direction from a state where the first cable protrusion and the second cable protrusion contact the first regulation protrusion and the second regulation protrusion respectively, the first cable protrusion and the second cable protrusion rotate about a contact point where the first cable protrusion and the second cable protrusion contact the first regulation protrusion and the second regulation protrusion such that the first cable protrusion and the second cable protrusion move away from the cable receiving surface and break contact with the first regulation protrusion and the second regulation protrusion allowing the cable to follow the movement of the image reader toward the second position.

15. An image forming apparatus comprising:
an image reading unit including:
   a document receiving portion configured to receive a document from which an image is to be read;
   an image reader configured to move between a first position located at a first end of the document receiving portion and a second position located at a second end, opposite to the first end, of the document receiving portion, the image reader being configured to read the image of the document received on the document receiving portion while moving in a predetermined direction;
   a cable having one end connected to the image reader;
   a first cable protrusion protruding outward from the cable in a width direction of the cable;
   a cable receiving member having a cable receiving surface configured to receive the cable; and
   a first regulation protrusion protruding upward to a predetermined height from the cable receiving surface and disposed in a position closer to the first position than the second position, as viewed in the width direction of the cable, and
   wherein the first regulation protrusion is disposed outside the cable in the width direction such that no portion of the first regulation protrusion overlaps the cable as viewed in a direction perpendicular to both the width direction of the cable and the predetermined direction of the image reader, and further such that, when the image reader moves in the predetermined direction from the first position to the second position, the first regulation protrusion regulates parallel movement of the first cable protrusion along the cable receiving surface in the predetermined direction, and allows the first cable protrusion to move past an upper portion of the regulation protrusion in the predetermined direction of the image reader; and
an image forming unit configured to form the image of the document read by the image reading unit on a recording medium.

16. The image forming apparatus according to claim 15, further comprising a second cable protrusion protruding outward from the cable in a direction opposite to the first cable protrusion, wherein the first cable protrusion, the second cable protrusion and the first regulation protrusion are configured such that, when the image reader moves in the predetermined direction from the first position to the second position, the first cable protrusion and the second cable protrusion move a predetermined distance in the predetermined direction and at least one of the first cable protrusion and the second cable protrusion contacts the first regulation protrusion, and the first regulation protrusion regulates a further movement of the first cable protrusion and the second cable protrusion in the predetermined direction.

17. The image forming apparatus according to claim 16, further comprising a film having a longer width than that of the cable, wherein the film is fixed to the cable, and includes the first cable protrusion and the second cable protrusion.

18. The image forming apparatus according to claim 16, further comprising a second regulation protrusion protruding from the cable receiving surface in a position opposite to the first regulation protrusion, wherein, when the image reader is in the first position, the cable passes between the first regulation protrusion and the second regulation protrusion, and the first regulation protrusion and the second regulation protrusion are spaced apart from the first cable protrusion and the second cable protrusion, respectively, by the predetermined distance, and wherein, when the image reader moves in the predetermined direction from the first position, the first cable protrusion and the second cable protrusion move the predetermined distance in the predetermined direction and contact the first regulation protrusion and the second regulation protrusion, respectively.

19. The image forming apparatus according to claim 18, wherein, when the image reader moves in the predetermined direction from a state where the first cable protrusion and the second cable protrusion contact the first regulation protrusion and the second regulation protrusion respectively, the first cable protrusion and the second cable protrusion rotate about a contact point where the first cable protrusion and the second cable protrusion contact the first regulation protrusion and the second regulation protrusion such that the first cable protrusion and the second cable protrusion move away from the cable receiving surface and break contact with the first regulation protrusion and the second regulation protrusion allowing the cable to follow the movement of the image reader toward the second position.

* * * * *